May 22, 1945.   G. F. BROCKETT   2,376,473
FLOAT ACTUATED MECHANISM
Filed July 12, 1943
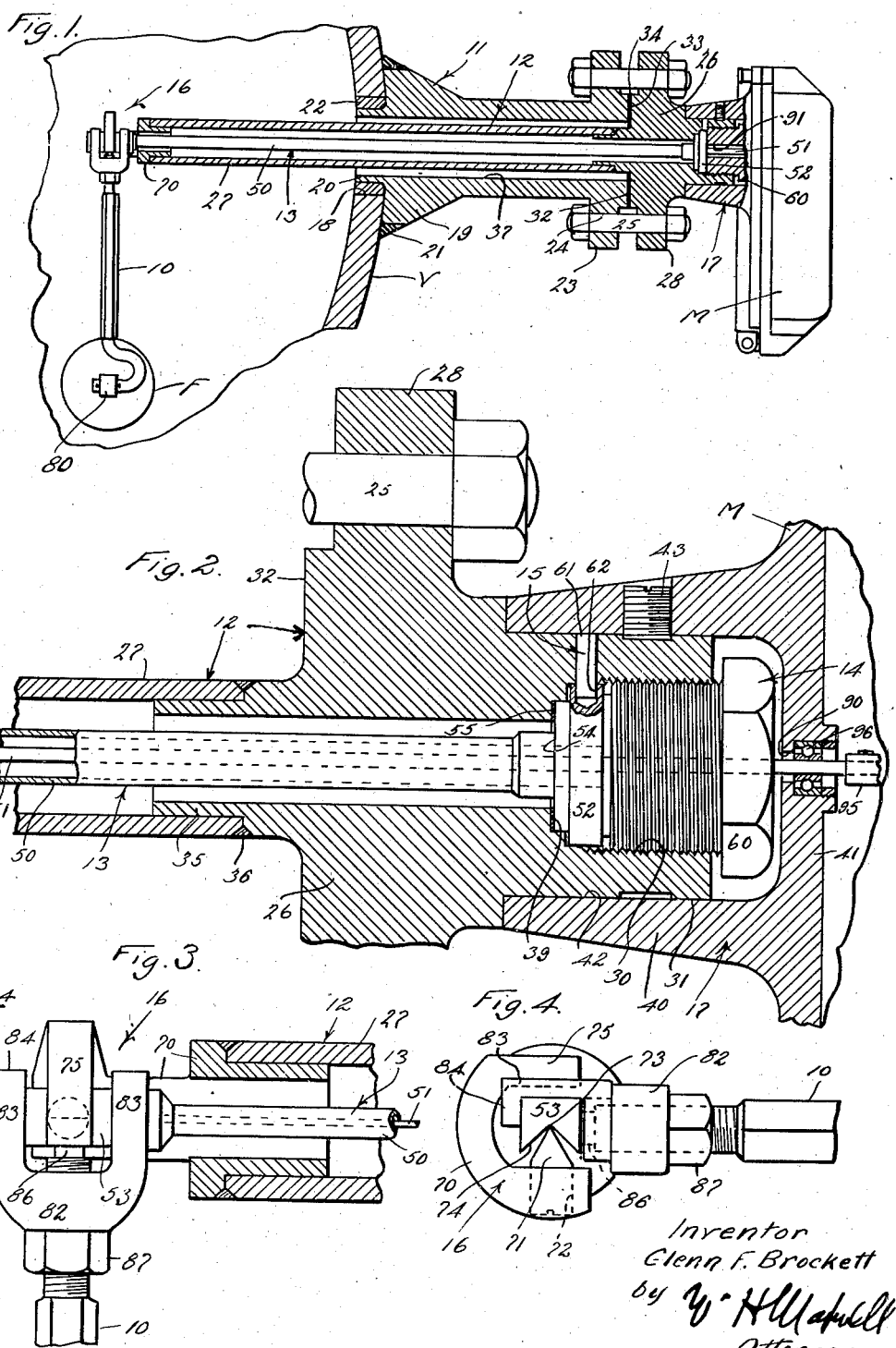
Inventor
Glenn F. Brockett
by *H. Maxwell*
Attorney Patented May 22, 1945

2,376,473

UNITED STATES PATENT OFFICE 2,376,473

FLOAT ACTUATED MECHANISM

Glenn F. Brockett, Marshalltown, Iowa, assignor to Fisher Governor Company, Marshalltown, Iowa, a corporation of Iowa Application July 12, 1943, Serial No. 494,341

6 Claims. (Cl. 137—104)

This invention relates to a mechanism to be actuated by means of a float, either as a specific gravity or a liquid level responsive device, and is adapted to actuate a control or pilot mechanism as circumstances may require. A general object of the invention is to provide a float actuated mechanism of the torque tube type which is extremely simple and economical of construction and at the same time accurate and dependable in operation.

There are many situations in which floats are employed within vessels to actuate control devices or pilot mechanisms at the exteriors of such vessels. The transmission of motion from a float within a vessel to a mechanism at the exterior thereof presents certain problems, particularly where the vessel carries materials that must be confined or where high pressures are involved. To transmit such motion by means of a shaft passing through packing or through a stuffing box is generally unsatisfactory, as it involves excessive friction and does not remain constant.

An effective and dependable means of transmitting motion through the wall of a vessel without the use of stuffing boxes, or the like, is by means of what is known as a torque tube construction. This construction involves, generally, a thin-walled tube having one end in communication with an opening in the wall of the vessel and fixed thereto, and the other end connected to the float within the vessel. A rod connects to the latter end of the tube and projects through the tube at the exterior of the vessel where it operates a pilot mechanism, or the like. Various arrangements of such torque tube devices are shown in the patent to Roschanek, No. 1,173,038.

In practice, under ordinary circumstances, the torque tube to have the desirable torque characteristic must be relatively light, or thin-walled, and as a result is generally not very strong. For effective action the tube must be of considerable length, and as a result, it has been found necessary in practice to provide a bearing or support for the inner or float-carrying end of the tube. Such a bearing or support is shown in the patent to Binckley, No. 1,827,560.

It is an object of my present invention to provide a compact, simplified construction whereby the float-carrying end of a torque tube is effectively and dependably supported. By the present invention I provide a support for the torque tube which effectively holds it in place with a minimum of friction and which involves an extremely simple and inexpensive arrangement of parts. By the present invention I have eliminated the necessity of complicated precision machine operations and at the same time have provided a tube support which accurately maintains the tube in perfect alignment at all times.

Another object of my invention is to provide a construction wherein there is a torque tube unit that can be manufactured entirely separate and apart from the other portions of the mechanism and then be readily applied thereto with a minimum of effort. The torque tube unit of the present invention has a head at its outer end which facilitates fixing or anchoring the unit in the other structure and has a block at its inner end which engages a bearing.

Another object of the present invention is to provide a structure of the character referred to in which there is a frame detachable from the vessel and which serves to carry the bearing for the torque tube, the mounting for the head of the torque tube, and also the mounting for the pilot mechanism actuated by the torque tube unit. Through the provision of a frame or single rigid structure the various parts of the mechanism are dependably supported in perfect alignment. The frame is such that the critical working parts are accurately and dependably related to one another so that the mechanism operates freely and without danger of misalignment or misplacement of the parts such as would otherwise create friction or improper operation.

A further object of the present invention is to provide various novel features of construction and arrangement of parts which make for a simple, dependable and durable mechanism of the general character mentioned.

The various objects and features of my invention will be fully understood from the following detailed description of a typical preferred form and application of the invention, throughout which description reference is made to the accompanying drawing, in which:

Fig. 1 is a horizontal sectional view taken through the structure of the present invention showing a typical form of the invention and manner of applying it to a liquid carrying vessel. Fig. 2 is an enlarged, detailed sectional view taken at the outer end portion of the structure showing in detail the manner in which the head of the torque tube unit is clamped in position and fixed against rotation and showing also the manner in which the pilot mechanism is supported by means of the frame provided by my invention. Fig. 3 is an enlarged view of the inner end portion of the torque tube unit, and Fig. 4 is an end view of the part shown in Fig. 3, being a view taken as indicated by line 4—4 on Fig. 3.

The mechanism provided by my present invention is applicable, generally, to structures or vessels V designed to carry a float F and wherein it is desired to communicate the action of the float F to a pilot mechanism M, or the like, at the exterior of the vessel. In Fig. 1 of the drawing I have shown a horizontal section through a vertical wall of a vessel V taken at a point where the structure of the present invention is applied thereto, and I have shown a simplified, compact arrangement of parts wherein the float F operates directly on the torque tube unit through a float lever 10 while the pilot mechanism M is operated directly by the operating rod of the torque tube unit.

The structure provided by my invention includes, generally, a mounting bracket 11 fixed to the wall of the vessel V to project laterally therefrom, a frame 12 including portions 26 and 27 and secured to the bracket 11, a torque tube unit 13, means 14 for clamping the torque tube unit to the frame 12, so that it is rigidly supported thereby, means 15 for fixing the torque tube unit against rotation relative to the frame 12, bearing means 16 supporting the inner end of the torque tube from the frame 12 so that the motion of the float lever 10 is communicated to the tube with a minimum of friction, and means 17 mounting the pilot mechanism M on the frame 12 concentric with the operating rod of the torque tube unit.

The bracket 11 is a tubular member arranged on the exterior of the vessel V in alignment with an opening 18 formed through the wall of the vessel to pass the torque tube unit. In practice the bracket 11 may be secured to the vessel V in any suitable manner, preferably so that it becomes a fixed or integral part of the vessel. In the particular case illustrated the bracket 11 has a base flange 19 which fits against the exterior of the vessel V and has a tubular extension 20 which projects into the opening 18. The marginal portion of the base flange 19 is secured to the vessel V by welding 21 and further welding may be provided at 22 to join the tubular extension 20 with the vessel V.

The bracket 11 is of substantial construction and projects a suitable distance outwardly beyond the outer wall of the vessel V and is provided at its outer end with means for receiving the frame 12. In practice various means may be provided for joining the frame and the bracket 11. In the case illustrated a bolted flange connection is employed, in which case a flange 23 is formed on the outer end of the bracket 11 with openings 24 to receive bolts 25.

The frame 12, which is a feature of the present invention, includes a body 26 to be applied to the outer end of the bracket 11, a tubular extension 27 on the body 26 projecting through the bracket 11 and into the vessel V where it supports the mounting means 16, a flange 28 on the body 26 to receive the mounting bolts 25, a socket 30 in the outer end of the body 26 to receive and carry the head of the torque tube unit and the clamping means 14, and a turned part 31 on the body 26 to guide and support the pilot mechanism M.

The body 26 of the frame 12 has a face 32 finished to engage the outer end 33 of the bracket 11. In practice a gasket 34 may be inserted between the faces 32 and 33 to effect a fluid-tight seal. The tubular extension 27 of the frame may be formed integral with the body 26, although in practice it is desirable to form it of a length of heavy walled tubing and to join it with the body proper through a suitable joint construction. In the case illustrated a tubular extension 35 is provided on the body 26 and the tube 27 is fitted over the extension and is secured in place by welding 36. The tubular extension 27 of the frame is supported by the body 26 so that it extends through the opening 37 of the bracket 11 with substantial clearance and projects a suitable distance into the vessel V so that the float F is supported with suitable clearance within the vessel V.

The socket 30 is formed in the body 26 from its outer end and so that it is concentric with the tubular extension 27. The inner end of the socket is finished to present a shoulder 39 for receiving the head of the torque tube unit. The socket 30 is screw-threaded to receive the clamp means 14.

The exterior of the body is turned at 31 concentric with the socket 30 and the tubular extension 27 to form a support for the pilot mechanism M. In the particular construction illustrated a boss 40 is formed on the body 41 of the mechanism M, which boss is bored out at 42 to slidably fit over the turned part 31, as clearly shown in Fig. 2 of the drawing.

The construction just described forms the means 17 by which the pilot mechanism M is supported on the frame in an aligned position. In practice a set screw 43 is preferably carried by the boss 40 to be tightened against the body of the frame to set the mechanism M in the desired rotative position on the body 26 of the structure.

The torque tube unit 13 is completely detachable from the other parts of the mechanism and includes, generally, a torque tube 50 which is a thin-walled tube of considerable length, an operating rod 51 arranged concentrically within the tube 50 and fitting the tube with substantial clearance, a head 52 fixed on the outer end of the tube 50 to surround the tube and to serve as a mounting means therefor, and a block 53 fixed on the inner end of the tube to close it and to serve as a means to carry the rod 51 and for engaging the supporting bearing.

The head 52 is welded or otherwise permanently fixed to the outer end of the torque tube 50 to project radially therefrom and presents a shoulder 54 to cooperate with the shoulder 39 in the bottom of the socket 30. In practice it is preferred to insert a gasket 55 as a seal between the shoulders 39 and 54.

The block 53 is welded or otherwise secured permanently to the inner end of the torque tube and the operating rod 51 is likewise fixed to the block 53 so that it projects concentrically through the tube 50 and extends beyond the outer end of the tube to project into the mechanism M, as clearly shown in Fig. 2.

The clamp means 14 is in the form of a plug screw-threaded into the socket 30 to engage the head 52 of the torque tube unit and clamp it tight against the shoulder 39 in the bottom of the socket 30. In the case illustrated the outer end of the plug is beyond the end of the body 26 and is provided with an hexagonal part 60 to be engaged by a wrench, or the like, so that the head of the torque tube unit can be tightly clamped in the socket of the body.

The means 15 provided for preventing rotation of the torque tube unit in the body 26 may be in the form of a lock pin 61 carried in an opening formed readily in the body 26 to project into a radial opening 62 formed in the peripheral portion of the head 52 of the torque tube unit. The lock pin, when in place, positively prevents rotation of the head of the torque tube unit in the socket and thus definitely orients the torque tube unit as to its rotative position in the frame.

The bearing means 16 serves to support the inner end of the torque tube from the tubular extension 27 of the frame 12. In accordance with the preferred form of the invention a bracket 70 is fixed to the inner end of the tubular extension 27 and carries a bearing member 71. The bearing member 71 is threaded in an opening 72 provided in the bracket 70 and has a knife edge 73 to engage in a V-shaped channel 74 formed in the under side of the block 53 at the inner end of the torque tube unit. The knife edge 73 and the bottom of the groove 74 are located to coincide with the longitudinal axis of the operating rod 51. A retaining arm 75 is provided on the bracket 70 to overhang the block 53 in order to prevent displacement of the block from the bearing 71. The arm 75 fits over the block 53 with substantial clearance so that it does not interfere with normal rocking or pivotal movement of the block incidental to operation of the mechanism.

The lever arm 10 which carries the float F through the connection 80 is detachably secured to the block 53 of the torque tube unit. The connection is made through a clamp device 82 which is threaded on the end of the lever 10. The clamp device has a pair of arms 83 which overhang the block 53 at either side of the arm 75 and fingers 84 depend from the ends of the arms 83 to hold the block 53. The end portion of the float lever 10 threads through the clamp device 82 so that its end portion 86 clamps against the block holding the block against the fingers 84, as clearly shown in Fig. 4 of the drawing. A lock nut 87 is provided on the threaded portion of the lever 10 to be clamped against the clamp device 82 to set the mechanism in the proper position.

Through the mechanism just described motion of the float F is communicated to the block 53 of the torque tube unit through the lever 10 and the clamp device 82. The block 53 of the torque tube unit is allowed to rotate about the axis of the bearing edge 73 due to the flexibility of the torque tube 50, it being notable that the outer end of the torque tube 50 is fixed or anchored through the head 52, as above described.

When the block 53 turns or rotates it carries with it the operating rod 51 of the torque tube unit which projects through the opening 91 provided in the clamp means 14 and through an opening 90 in the body 41 of the pilot mechanism M to terminate within the pilot mechanism. In practice the operating rod 51 of the torque tube unit may receive a sleeve or other part 95 of the pilot mechanism to operate the same. The operating rod may pass freely through the opening 41 so it engages and actuates the mechanism of the pilot mechanism M without support or, if desired, a suitable bearing, such as a ball bearing 96, may be provided at the opening 90 to support the rod 51 at the mechanism M.

From the foregoing description it will be apparent that I have provided a very simple, inexpensive, mechanism whereby the parts are all dependably supported in proper alignment so that the mechanism is simple, compact and dependable in operation. The bearing means 16 provides a free, dependable bearing for the inner end of the torque tube unit and the mechanism of the clamp device 82 allows the float lever 10 to be readily applied to the inner end of the torque tube unit so that the motion of the float is communicated to the block of the torque tube unit.

The outer end of the torque tube unit is effectively and dependably secured in place in the frame through the head 52 of the torque tube unit and the clamp means 14, the means 15 serving to positively orient the torque tube unit in the frame.

The turned part 31 on the frame body 26 and the bored out boss 40 on the mechanism M serve to accurately align the mechanism M with the other parts so that the operating rod 51 of the torque tube unit works the mechanism of the pilot mechanism M without binding. It is to be understood that any desired control or mechanism may be provided in the pilot mechanism M to be operated by the rod 51.

It is to be noted in particular that the mechanism of the present invention is all simple of construction and is such as to be conveniently assembled or taken apart for purpose of replacement or repair. The parts are all readily accessible and can be handled without special tools or equipment.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. In a mechanism of the character described, a bracket on a vessel, a frame attached to the bracket and including a body having a socket, a tubular extension coaxial with the socket and extending into the vessel, a finished part on the body coaxial with the extension and a bearing carried by the extension within the vessel, a torque tube unit carried in the extension and having a head fixedly held in the socket and a bearing block pivotally supported by the bearing, a mechanism to be operated by the unit and engaging the finished part of the body to be wholly supported thereby, and a float in the vessel to operate the unit.

2. In a mechanism of the character described, a bracket on a vessel, a frame attached to the bracket and including a body having a socket, a tubular extension coaxial with the socket and extending into the vessel, a finished part on the body coaxial with the extension and a bearing carried by the extension within the vessel, a torque tube unit carried in the extension and having a head fixedly held in the socket and a bearing block supported by the bearing, a mechanism to be operated by the unit and engaging the finished part of the body to be supported thereby, the mechanism having a bored part fitting the finished part of the body to be supported thereby, the mechanism being connected with the unit to be operated thereby, and a float in the vessel connected with the unit to operate it.

3. In a mechanism of the character described, a frame rigidly connected with a vessel and including a body having a socket in its outer end, having a turned part concentric with the socket, having a tubular extension coaxial with the socket and extending into the vessel and having a bearing at the inner end of the extension, a torque tube unit carried in the extension and having a tube with a head at its outer end fixedly carried in the socket and a block at its inner end supported by the bearing and having a rod connected with the block and projecting freely through the tube to project from the outer end of the frame, a mechanism mounted on the turned part of the body and receiving the projecting end of the rod, and a float in the vessel operatively connected with the block.

4. In a mechanism of the character described, a frame rigidly connected with a vessel and including a body having a socket in its outer end, having a turned part concentric with the socket, having a tubular extension coaxial with the socket and extending into the vessel and having a bearing at the inner end of the extension, a torque tube unit carried in the extension and having a tube with a head at its outer end fixedly carried in the socket and a block at its inner end supported by the bearing and having a rod connected with the block and projecting freely through the tube to project from the outer end of the frame, a mechanism mounted on the turned part of the body and receiving the projecting end of the rod, the mechanism having a cored boss which fits over the turned part of the body, and a float in the vessel operatively connected with the block.

5. In a mechanism of the character described, a frame rigidly connected with a vessel and including a body having a socket in its outer end, having a turned part concentric with the socket, having a tubular extension coaxial with the socket and extending into the vessel and having a bearing at the inner end of the extension, a torque tube unit carried in the extension and having a tube with a head at its outer end fixedly carried in the socket and a block at its inner end supported by the bearing and having a rod connected with the block and projecting freely through the tube to project from the outer end of the frame, a mechanism mounted on the turned part of the body and receiving the projecting end of the rod, a float in the vessel, and means connecting the float and block including a releasable clamp carried by the float and engaging the block.

6. In a mechanism of the character described, a frame rigidly connected with a vessel and including a body having a socket in its outer end, having a turned part concentric with the socket, having a tubular extension coaxial with the socket and extending into the vessel and having a bearing at the inner end of the extension, a torque tube unit carried in the extension and having a tube with a head at its outer end fixedly carried in the socket and a block at its inner end supported by the bearing and having a rod connected with the block and projecting freely through the tube to project from the outer end of the frame, a mechanism mounted on the turned part of the body and receiving the projecting end of the rod, a float in the vessel, and means connecting the float and block including a lever connected with the float, and a clamp engaging the block, the lever being threaded to the clamp to tighten the clamp on the block.

GLENN F. BROCKETT.